United States Patent
He

(10) Patent No.: US 10,447,363 B2
(45) Date of Patent: Oct. 15, 2019

(54) MULTI-ANTENNA TRANSMISSION METHOD IN CO-CELL NETWORK, AND BASE STATION

(71) Applicant: HUAWEI TECHNOLOGIES CO., LTD., Shenzhen, Guangdong (CN)

(72) Inventor: Longke He, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/995,398

(22) Filed: Jun. 1, 2018

(65) Prior Publication Data

US 2018/0278307 A1    Sep. 27, 2018

Related U.S. Application Data

(63) Continuation of application No. PCT/CN2016/092181, filed on Jul. 29, 2016.

(30) Foreign Application Priority Data

Dec. 3, 2015 (WO) ................ PCT/CN2015/096225

(51) Int. Cl.
*H04B 7/06* (2006.01)
*H04L 1/06* (2006.01)
(Continued)

(52) U.S. Cl.
CPC .......... *H04B 7/0613* (2013.01); *H04B 7/024* (2013.01); *H04B 7/0617* (2013.01); *H04L 1/06* (2013.01);
(Continued)

(58) Field of Classification Search
CPC .. H04B 7/0613; H04B 7/0617; H04B 7/0684; H04B 7/024; H04B 7/0456;
(Continued)

(56) References Cited

U.S. PATENT DOCUMENTS

2005/0249306 A1  11/2005  Chae et al.
2008/0247364 A1  10/2008  Kim et al.
(Continued)

FOREIGN PATENT DOCUMENTS

CA    2731210 A1    2/2010
CN    101262308 A    9/2008
(Continued)

OTHER PUBLICATIONS

3GPP TS 36.331 V12.7.0 (Sep. 2015);3rd Generation Partnership Project;Technical Specification Group Radio Access Network;Evolved Universal Terrestrial Radio Access (E-UTRA);Radio Resource Control (RRC);Protocol specification (Release 12),total 453 pages.
(Continued)

*Primary Examiner* — Mewale A Ambaye
(74) *Attorney, Agent, or Firm* — Fish & Richardson P.C.

(57) ABSTRACT

The present disclosure relates to a multi-antenna transmission method in a co-cell network. The co-cell network includes a first cell and a second cell. The first cell corresponds to two physical antennas, and the second cell corresponds to two physical antennas different from the two physical antennas corresponding to the first cell. In one example method, a base station performs four-antenna precoding processing for a scheduled terminal. The four-antenna precoding processing generates four logical antenna port signals. The base station maps the four logical antenna port signals to the four physical antennas. The base station sends, to the terminal, the four logical antenna port signals through the mapped four physical antennas.

14 Claims, 6 Drawing Sheets

A base station performs four-antenna precoding processing for a scheduled terminal, and generates four logical antenna port signals — S301

The base station maps the four logical antenna port signals to four physical antennas, and sends, to the terminal, signals obtained through mapping, where the four physical antennas are two physical antennas corresponding to a first cell and two physical antennas corresponding to a second cell — S302

(51) Int. Cl.
*H04L 5/00* (2006.01)
*H04W 72/04* (2009.01)
*H04W 88/02* (2009.01)
*H04B 7/024* (2017.01)
*H04W 16/28* (2009.01)

(52) U.S. Cl.
CPC ......... *H04L 5/005* (2013.01); *H04W 72/0413* (2013.01); *H04W 88/02* (2013.01); *H04W 16/28* (2013.01)

(58) Field of Classification Search
CPC ... H04B 7/0636; H04B 7/0639; H04W 16/28; H04W 72/0413; H04W 88/02
See application file for complete search history.

(56) References Cited

U.S. PATENT DOCUMENTS

| | | | |
|---|---|---|---|
| 2008/0273452 | A1 | 11/2008 | Khan et al. |
| 2010/0048233 | A1 | 2/2010 | Kim et al. |
| 2011/0013713 | A1 | 1/2011 | Li et al. |
| 2014/0177467 | A1 | 6/2014 | Kim |
| 2015/0180628 | A1 | 6/2015 | Kim et al. |
| 2015/0244442 | A9 | 8/2015 | Rudrapatna et al. |
| 2015/0280801 | A1* | 10/2015 | Xin ..................... H04B 7/0478 370/329 |
| 2016/0050001 | A1* | 2/2016 | Kang ................... H04B 7/0617 370/329 |
| 2017/0005712 | A1* | 1/2017 | Jiang ................... H04B 7/0413 |

FOREIGN PATENT DOCUMENTS

| | | |
|---|---|---|
| CN | 101599785 A | 12/2009 |
| CN | 102014395 A | 4/2011 |
| CN | 103368696 A | 10/2013 |
| CN | 103391128 A | 11/2013 |
| CN | 103650564 A | 3/2014 |
| CN | 103891167 A | 6/2014 |
| CN | 103907291 A | 7/2014 |
| CN | 104541460 A | 4/2015 |
| EP | 2385635 A2 | 11/2011 |
| JP | 2007527680 A | 9/2007 |
| JP | 2010519794 A | 6/2010 |
| JP | 2011024218 A | 2/2011 |
| JP | 2011530207 A | 12/2011 |
| JP | 2014053930 A | 3/2014 |
| WO | 2012144866 A2 | 10/2012 |
| WO | 2014098523 A1 | 6/2014 |
| WO | 2014208974 A1 | 12/2014 |

OTHER PUBLICATIONS

3GPP TS 36.213 V12.7.0 (Sep. 2015);3rd Generation Partnership Project;Technical Specification Group Radio Access Network;Evolved Universal Terrestrial Radio Access (E-UTRA);Physical layer procedures(Release 12),total 241 pages.
International Search Report issued in International Application No. PCT/CN2015/096225 dated Aug. 31, 2016, 4 pages.
International Search Report issued in International Application No. PCT/CN2016/092181 dated Oct. 31, 2016, 6 pages.
CN Office Action in Chinese Application No. 201680001856.8, dated Apr. 18, 2019, 17 pages (with English translation).
Communication Pursuant to Rule 164(1) EPC issued in European Application No. 16869694.6 dated Oct. 12, 2018, 15 pages.
Office Action issued in Japanese Application No. 2018-528778 dated Jul. 2, 2019, 9 pages (with English translation).

* cited by examiner

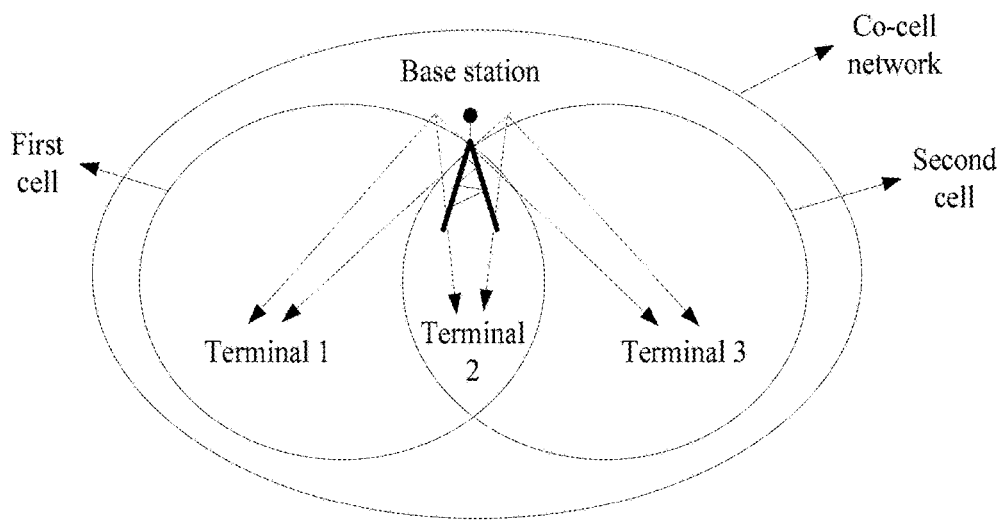

FIG. 2

```
┌─────────────────────────────────────────────────────────┐
│ A base station performs four-antenna precoding processing for │  S301
│ a scheduled terminal, and generates four logical antenna port │
│                        signals                          │
└─────────────────────────────────────────────────────────┘
                             │
                             ▼
┌─────────────────────────────────────────────────────────┐
│  The base station maps the four logical antenna port signals to │  S302
│    four physical antennas, and sends, to the terminal, signals  │
│    obtained through mapping, where the four physical antennas   │
│  are two physical antennas corresponding to a first cell and two│
│       physical antennas corresponding to a second cell          │
└─────────────────────────────────────────────────────────┘
```

FIG. 3

MULTI-ANTENNA TRANSMISSION METHOD IN CO-CELL NETWORK, AND BASE STATION

CROSS-REFERENCE TO RELATED APPLICATIONS

This application is a continuation of International Application No. PCT/CN2016/092181, filed on Jul. 29, 2016, which claims priority to International Application No. PCT/CN2015/096225, filed on Dec. 3, 2015. The disclosures of the aforementioned applications are hereby incorporated by reference in their entireties.

TECHNICAL FIELD

The present disclosure relates to the field of wireless communications, and in particular, to a multi-antenna transmission method in a co-cell network, and a base station.

BACKGROUND

Rapid development of the mobile internet and a continuous increase in a quantity of network users impose an increasingly higher requirement on a capacity of a wireless network. There are two conventional manners for improving a network capacity: A first manner is adding a new site, and a second manner is adding a system spectrum to extend a carrier frequency. However, due to difficulty in obtaining a site, high costs for deploying a new site, and a limited quantity of wireless spectrum resources, it is difficult to rapidly improve the network capacity in the two conventional manners.

Currently, a sector splitting technology is a cost-effective technical solution for improving the network capacity without adding a new site or a system spectrum. In the sector splitting technology, a sector cell requiring a relatively high network capacity is split into two sector cells; each of the two sector cells obtained by splitting is planned as a cell, where each sector cell uses a cell identifier; and a resource is reused for the two sector cells obtained by splitting, so as to improve a network capacity. However, compared with the original sector cell, an area of each sector cell obtained by using the sector splitting technology is decreased, that is, a coverage area of the cell is decreased, a quantity of cells is increased, and inter-cell interference is severer. This affects network performance such as handover and access, and makes network planning and optimization more complex.

To overcome a problem of the severer inter-cell interference caused by the sector splitting technology, a co-cell networking technology may be applied to the two sector cells obtained by using the sector splitting technology. The co-cell networking technology is combining two sector cells obtained by using the sector splitting technology to form a co-cell network, where the two sector cells in the same co-cell network share a cell identifier. In this way, a network capacity is improved by using the sector splitting technology, network performance such as handover and access is not affected, and complexity of network planning and optimization is reduced. The co-cell networking technology may also be applied to two sector cells that have not been processed by using the sector splitting technology. The two sector cells that have not been processed by using the sector splitting technology are combined to form a co-cell network, and the two sector cells in same the co-cell network share a cell identifier.

A virtual 6-sector cell is used as an example. A conventional 3-sector cell is shown in FIG. 1 (*a*). Sector cells shown in FIG. 1 (*b*) are obtained after each sector cell in FIG. 1 (*a*) is processed by using the sector splitting technology. For example, a cell 0 is split into two sector cells after cell splitting, and the two sector cells share a cell identifier of the cell 0.

In the co-cell network, a base station sends common pilot signals together and sends user data independently. Therefore, a channel mismatch problem exists, and a system throughput is affected.

SUMMARY

Embodiments of the present disclosure provide a multi-antenna transmission method in a co-cell network, and a base station, to improve a system throughput.

According to a first aspect, an embodiment of the present disclosure provides a multi-antenna transmission method in a co-cell network, where the co-cell network includes a first cell and a second cell, the first cell is corresponding to two physical antennas, the second cell is corresponding to two physical antennas, and the method includes:

performing, by a base station, four-antenna precoding processing for a scheduled terminal, and generating four logical antenna port signals; and mapping, by the base station, the four logical antenna port signals to four physical antennas, and sending, to the terminal, signals obtained through mapping, where the four physical antennas are the two physical antennas corresponding to the first cell and the two physical antennas corresponding to the second cell.

With reference to the first aspect, in a first possible implementation, the mapping, by the base station, the four logical antenna port signals to four physical antennas includes:

mapping, by the base station, the four logical antenna port signals to the four physical antennas by using a mapping matrix, where the mapping matrix, the four logical antenna port signals, and the signals respectively sent by the four physical antennas meet any one of the following relational expressions:

$$\frac{1}{\sqrt{2}}\begin{bmatrix} 1 & 0 & 1 & 0 \\ 0 & 1 & 0 & 1 \\ 0 & -j & 0 & j \\ -j & 0 & j & 0 \end{bmatrix} \cdot \begin{bmatrix} X_0 \\ X_1 \\ X_2 \\ X_3 \end{bmatrix} = \frac{1}{\sqrt{2}}\begin{bmatrix} X_0 + X_2 \\ X_1 + X_3 \\ -j(X_1 + X_3) \\ -j(X_0 + X_2) \end{bmatrix}; \text{or}$$

$$\frac{1}{\sqrt{2}}\begin{bmatrix} 1 & 0 & 1 & 0 \\ 0 & 1 & 0 & 1 \\ 0 & 1 & 0 & -1 \\ 1 & 0 & -1 & 0 \end{bmatrix} \cdot \begin{bmatrix} X_0 \\ X_1 \\ X_2 \\ X_3 \end{bmatrix} = \frac{1}{\sqrt{2}}\begin{bmatrix} X_0 + X_2 \\ X_1 + X_3 \\ X_1 - X_3 \\ X_0 - X_2 \end{bmatrix}; \text{or}$$

$$\frac{1}{\sqrt{2}}\begin{bmatrix} 1 & 0 & 1 & 0 \\ 0 & 1 & 0 & 1 \\ -j & 0 & j & 0 \\ 0 & -j & 0 & j \end{bmatrix} \cdot \begin{bmatrix} X_0 \\ X_1 \\ X_2 \\ X_3 \end{bmatrix} = \frac{1}{\sqrt{2}}\begin{bmatrix} X_0 + X_2 \\ X_1 + X_3 \\ -j(X_0 + X_2) \\ -j(X_1 + X_3) \end{bmatrix},$$

where $X_0$, $X_1$, $X_2$ and $X_3$ represent the four logical antenna port signals.

With reference to the first aspect or the first possible implementation of the first aspect, in a second possible implementation of the first aspect, the method further includes:

obtaining, by the base station, reference signal received power RSRP reported by the terminal, where the RSRP includes RSRP of the first cell and RSRP of the second cell;

obtaining, by the base station, a precoding matrix indicator PMI reported by the terminal;

obtaining, by the base station, a rank indicator RI reported by the terminal; and determining, by the base station, a scheduling manner of the terminal according to the RSRP, the PMI, and the RI, and performing scheduling on the terminal according to the scheduling manner, where the scheduling manner includes independent scheduling and joint scheduling.

With reference to the second possible implementation of the first aspect, in a third possible implementation of the first aspect, the determining, by the base station, a scheduling manner of the terminal according to the RSRP, the PMI, and the RI includes:

when an absolute value of a difference between the RSRP of the first cell and the RSRP of the second cell is greater than a first threshold and less than a second threshold, the PMI is any one of 0, 1, 2, 3, 8, 9, 10, or 11, and the RI is 1, determining, by the base station, to perform independent scheduling on the terminal.

With reference to the second possible implementation of the first aspect, in a fourth possible implementation of the first aspect, the determining, by the base station, a scheduling manner of the terminal according to the RSRP, the PMI, and the RI includes:

when an absolute value of a difference between the RSRP of the first cell and the RSRP of the second cell is greater than or equal to a second threshold, the PMI is any one of 0, 1, 2, 3, 8, 9, 10, or 11, and the RI is 1, determining, by the base station, to perform independent scheduling on the terminal.

With reference to the second possible implementation of the first aspect, in a fifth possible implementation of the first aspect, the determining, by the base station, a scheduling manner of the terminal according to the RSRP, the PMI, and the RI includes:

when an absolute value of a difference between the RSRP of the first cell and the RSRP of the second cell is greater than or equal to a second threshold, the PMI is 10 or 11, and the RI is 2, determining, by the base station, to perform independent scheduling on the terminal.

With reference to the second possible implementation of the first aspect, in a sixth possible implementation of the first aspect, the determining, by the base station, a scheduling manner of the terminal according to the RSRP, the PMI, and the RI includes:

when an absolute value of a difference between the RSRP of the first cell and the RSRP of the second cell is less than or equal to a first threshold, determining, by the base station, to perform joint scheduling on the terminal; or when an absolute value of a difference between the RSRP of the first cell and the RSRP of the second cell is greater than a first threshold and less than a second threshold, and the RI is not 1, determining, by the base station, to perform joint scheduling on the terminal.

With reference to the second possible implementation of the first aspect, in a seventh possible implementation of the first aspect, the obtaining, by the base station, a precoding matrix indicator PMI reported by the terminal includes:

delivering, by the base station, a PMI measurement restriction indication to the terminal according to an absolute value of a difference between the RSRP of the first cell and the RSRP of the second cell, where the PMI measurement restriction indication is used by the terminal to perform PMI measurement according to the PMI measurement restriction indication; and obtaining, by the base station, the PMI reported by the terminal.

According to a second aspect, an embodiment of the present disclosure provides a base station, where a co-cell network in which the base station is located includes a first cell and a second cell, the first cell is corresponding to two physical antennas, the second cell is corresponding to two physical antennas, and the base station includes:

a transceiver unit, configured to receive or send a signal; and a processing unit, configured to: perform four-antenna precoding processing for a terminal scheduled by the base station, and generate four logical antenna port signals; and map the four logical antenna port signals to four physical antennas, and control the transceiver unit to send, to the terminal, signals obtained through mapping, where the four physical antennas are the two physical antennas corresponding to the first cell and the two physical antennas corresponding to the second cell.

With reference to the second aspect, in a first possible implementation, when the processing unit maps the four logical antenna port signals to the four physical antennas, the processing unit is specifically configured to:

map the four logical antenna port signals to the four physical antennas by using a mapping matrix, where the mapping matrix, the four logical antenna port signals, and the signals respectively sent by the four physical antennas meet any one of the following relational expressions:

$$\frac{1}{\sqrt{2}}\begin{bmatrix} 1 & 0 & 1 & 0 \\ 0 & 1 & 0 & 1 \\ 0 & -j & 0 & j \\ -j & 0 & j & 0 \end{bmatrix} \cdot \begin{bmatrix} X_0 \\ X_1 \\ X_2 \\ X_3 \end{bmatrix} = \frac{1}{\sqrt{2}}\begin{bmatrix} X_0 + X_2 \\ X_1 + X_3 \\ -j(X_1 + X_3) \\ -j(X_0 + X_2) \end{bmatrix}; \text{or}$$

$$\frac{1}{\sqrt{2}}\begin{bmatrix} 1 & 0 & 1 & 0 \\ 0 & 1 & 0 & 1 \\ 0 & 1 & 0 & -1 \\ 1 & 0 & -1 & 0 \end{bmatrix} \cdot \begin{bmatrix} X_0 \\ X_1 \\ X_2 \\ X_3 \end{bmatrix} = \frac{1}{\sqrt{2}}\begin{bmatrix} X_0 + X_2 \\ X_1 + X_3 \\ X_1 - X_3 \\ X_0 - X_2 \end{bmatrix}; \text{or}$$

$$\frac{1}{\sqrt{2}}\begin{bmatrix} 1 & 0 & 1 & 0 \\ 0 & 1 & 0 & 1 \\ -j & 0 & j & 0 \\ 0 & -j & 0 & j \end{bmatrix} \cdot \begin{bmatrix} X_0 \\ X_1 \\ X_2 \\ X_3 \end{bmatrix} = \frac{1}{\sqrt{2}}\begin{bmatrix} X_0 + X_2 \\ X_1 + X_3 \\ -j(X_0 + X_2) \\ -j(X_1 + X_3) \end{bmatrix},$$

where $X_0$, $X_1$, $X_2$, and $X_3$ represent the four logical antenna port signals.

With reference to the second aspect or the first possible implementation of the second aspect, in a second possible implementation of the second aspect, the transceiver unit is further configured to:

obtain reference signal received power RSRP reported by the terminal, where the RSRP includes RSRP of the first cell and RSRP of the second cell;

obtain a precoding matrix indicator PMI reported by the terminal; and obtain a rank indicator RI reported by the terminal; and the processing unit is further configured to:

determine a scheduling manner of the terminal according to the RSRP, the PMI, and the RI that are obtained by the transceiver unit, and perform scheduling on the terminal according to the scheduling manner, where the scheduling manner includes independent scheduling and joint scheduling.

With reference to the second possible implementation of the second aspect, in a third possible implementation of the second aspect, when the processing unit determines the scheduling manner of the terminal according to the RSRP, the PMI, and the RI that are obtained by the transceiver unit, the processing unit is specifically configured to:

when an absolute value of a difference between the RSRP of the first cell and the RSRP of the second cell is greater than a first threshold and less than a second threshold, the PMI is any one of 0, 1, 2, 3, 8, 9, 10, or 11, and the RI is 1, determine to perform independent scheduling on the terminal.

With reference to the second possible implementation of the second aspect, in a fourth possible implementation of the second aspect, when the processing unit determines the scheduling manner of the terminal according to the RSRP, the PMI, and the RI that are obtained by the transceiver unit, the processing unit is specifically configured to:

when an absolute value of a difference between the RSRP of the first cell and the RSRP of the second cell is greater than or equal to a second threshold, the PMI is any one of 0, 1, 2, 3, 8, 9, 10, or 11, and the RI is 1, determine to perform independent scheduling on the terminal.

With reference to the second possible implementation of the second aspect, in a fifth possible implementation of the second aspect, when the processing unit determines the scheduling manner of the terminal according to the RSRP, the PMI, and the RI that are obtained by the transceiver unit, the processing unit is specifically configured to:

when an absolute value of a difference between the RSRP of the first cell and the RSRP of the second cell is greater than or equal to a second threshold, the PMI is 10 or 11, and the RI is 2, determine to perform independent scheduling on the terminal.

With reference to the second possible implementation of the second aspect, in a sixth possible implementation of the second aspect, when the processing unit determines the scheduling manner of the terminal according to the RSRP, the PMI, and the RI that are obtained by the transceiver unit, the processing unit is specifically configured to:

when an absolute value of a difference between the RSRP of the first cell and the RSRP of the second cell is less than or equal to a first threshold, determine to perform joint scheduling on the terminal; or when an absolute value of a difference between the RSRP of the first cell and the RSRP of the second cell is greater than a first threshold and less than a second threshold, and the RI is not 1, determine to perform joint scheduling on the terminal.

With reference to the second possible implementation of the second aspect, in a seventh possible implementation of the second aspect, the processing unit is further configured to:

determine, according to an absolute value of a difference between the RSRP of the first cell and the RSRP of the second cell, a PMI measurement restriction indication to be delivered to the terminal, where the PMI measurement restriction indication is used by the terminal to perform PMI measurement according to the PMI measurement restriction indication; and when the transceiver unit obtains the precoding matrix indicator PMI reported by the terminal, the transceiver unit is specifically configured to:

deliver the PMI measurement restriction indication determined by the processing unit to the terminal; and obtain the PMI that is reported by the terminal according to the PMI measurement restriction indication.

According to a third aspect, an embodiment of the present disclosure provides a method for scheduling a terminal in a co-cell network, where the co-cell network includes a first cell and a second cell, the first cell is corresponding to two physical antennas, the second cell is corresponding to two physical antennas, and the method includes:

obtaining, by a base station, reference signal received power RSRP reported by a terminal, where the RSRP includes RSRP of the first cell and RSRP of the second cell;

obtaining, by the base station, a precoding matrix indicator PMI reported by the terminal;

obtaining, by the base station, a rank indicator RI reported by the terminal; and determining, by the base station, a scheduling manner of the terminal according to the RSRP, the PMI, and the RI, and performing scheduling on the terminal according to the scheduling manner, where the scheduling manner includes independent scheduling and joint scheduling.

According to a fourth aspect, an embodiment of the present disclosure provides a base station, where a co-cell network in which the base station is located includes a first cell and a second cell, the first cell is corresponding to two physical antennas, the second cell is corresponding to two physical antennas, and the base station includes:

a transceiver unit, configured to: obtain reference signal received power RSRP reported by a terminal, where the RSRP includes RSRP of the first cell and RSRP of the second cell; obtain a precoding matrix indicator PMI reported by the terminal; and obtain a rank indicator RI reported by the terminal; and a processing unit, configured to: determine a scheduling manner of the terminal according to the RSRP, the PMI, and the RI that are obtained by the transceiver unit, and perform scheduling on the terminal according to the scheduling manner, where the scheduling manner includes independent scheduling and joint scheduling.

In the embodiments of the present disclosure, the base station maps the generated four logical antenna port signals to the four physical antennas in the co-cell network, and sends, to the terminal, the signals obtained through mapping. This can resolve a problem of channel mismatch in an existing co-cell network caused by joint transmission on a control channel and independent transmission on a data channel, and improves the system throughput. Compared with a quantity of logical antenna ports in a co-cell network in the prior art, a quantity of logical antenna ports in the co-cell network in the embodiments of the present disclosure is increased, so that a peak quantity of users that can be supported by the co-cell network is increased, and the system throughput can be improved. The embodiments of the present disclosure further provide the method for scheduling a terminal in a co-cell network, to further improve a network capacity.

BRIEF DESCRIPTION OF DRAWINGS

FIG. 1 (b) is a schematic structural diagram of a virtual 6-sector cell;

FIG. 2 is a schematic architectural diagram of a co-cell network according to an embodiment of the present disclosure;

FIG. 3 is a schematic flowchart of a multi-antenna transmission method in a co-cell network according to an embodiment of the present disclosure;

DESCRIPTION OF EMBODIMENTS

Figure 1:
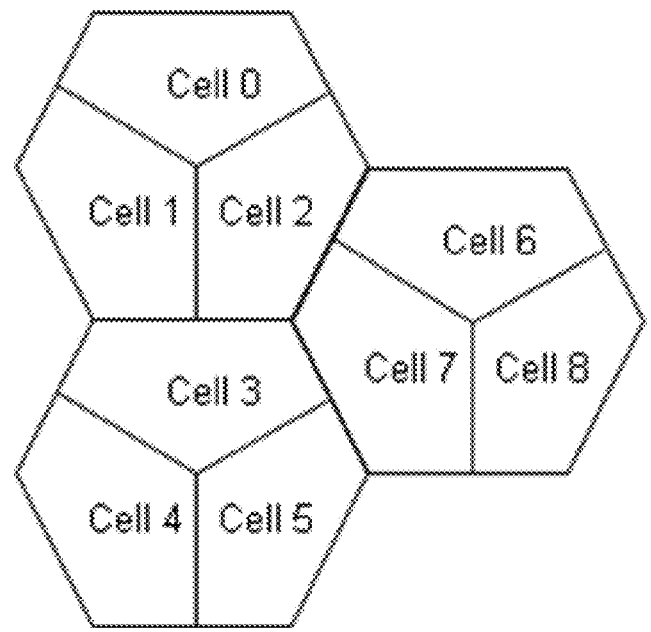
FIG. 1 (a) is a schematic structural diagram of a conventional 3-sector cell.
Figure 1:
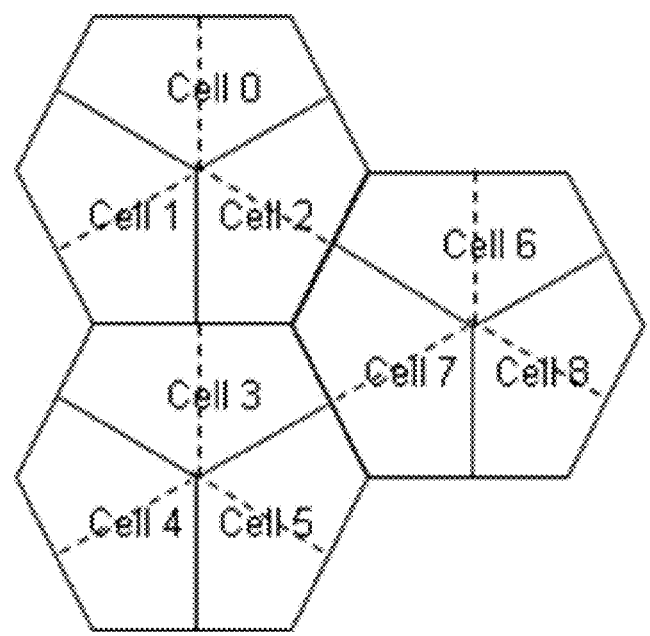

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present application.

The embodiments of the present disclosure provide a multi-antenna transmission method in a co-cell network, and a base station, to improve a system throughput. The method and the apparatus are based on a same inventive concept. Because principles of resolving problems according to the method and the apparatus are similar, mutual reference may be made for implementations of the apparatus and the method, and same content is not repeated.

The embodiments of the present disclosure are applicable to a wireless communications system, such as a Universal Mobile Telecommunications System (UMTS), a Global System for Mobile Communications (GSM), a Long Term Evolution (LTE) system, a Long Term Evolution Advanced (LTE-A) system, or a future wireless communications system.

The base station may be an evolved NodeB (eNodeB) in LTE or LTE-A. One base station can support/manage one or more cells.

A user equipment (UE) may also be referred to as a mobile terminal (MT), a mobile station (MS), or the like.

Each base station can serve a plurality of UEs. UE selects a cell to initiate network access, and performs a voice and/or data service with the base station.

The embodiments of the present disclosure relate to a co-cell networking technology, in which two sector cells are combined to form a co-cell network, and the two sector cells in the same co-cell network share a cell identifier.

The two sector cells included in the co-cell network in the embodiments of the present disclosure may be two sector cells that have not been processed by using a sector splitting technology, or may be two sector cells that are obtained by splitting a sector cell by using the sector splitting technology. The sector splitting technology includes horizontal split and vertical split. With the development of the co-cell networking technology, a quantity of sector cells included in the co-cell network is not limited to two, a quantity of physical antennas corresponding to each sector cell included in the co-cell network is not limited to two, and an idea of the technical solutions provided in the embodiments of the present disclosure is still applicable.

In the following embodiments, two sector cells included in a co-cell network are referred to as a first cell and a second cell, the first cell is corresponding to two physical antennas, the second cell is corresponding to two physical antennas, and a base station performs scheduling on a terminal in the co-cell network. For the co-cell network in the embodiments of the present disclosure, refer to a co-cell network shown in FIG. 2.

As shown in FIG. 3, an embodiment of the present disclosure provides a multi-antenna transmission method in a co-cell network. The method includes the following steps:

S301. A base station performs four-antenna precoding processing for a scheduled terminal, and generates four logical antenna port signals.

S302. The base station maps the four logical antenna port signals to four physical antennas, and sends, to the terminal, signals obtained through mapping, where the four physical antennas are two physical antennas corresponding to a first cell and two physical antennas corresponding to a second cell.

In this embodiment of the present disclosure, the base station performs four-antenna precoding processing for the scheduled terminal, and generates the four logical antenna port signals. The base station can schedule the terminal in a manner of independent scheduling or joint scheduling.

For example, in the co-cell network shown in FIG. 2, if the base station performs independent scheduling on a terminal 1 in a first cell, the base station performs precoding processing for the terminal 1 by using a resource of the first cell, generates four logical antenna port signals, maps the generated four logical antenna port signals to four physical antennas, and sends, to the terminal 1, signals obtained through mapping. If the base station performs joint scheduling on a terminal 2, and the terminal 2 is located in an overlapped region of the first cell and a second cell, the base station performs precoding processing for the terminal 2 by using a resource of the first cell, generates four logical antenna port signals, maps, to four physical antennas, the four logical antenna port signals that are generated by using the resource of the first cell, and sends, to the terminal 2, signals obtained through mapping; and the base station performs precoding processing for the terminal 2 by using a resource of the second cell, generates four logical antenna port signals, maps, to the four physical antennas, the four logical antenna port signals that are generated by using the resource of the second cell, and sends, to the terminal 2, signals obtained through mapping.

Figure 4:
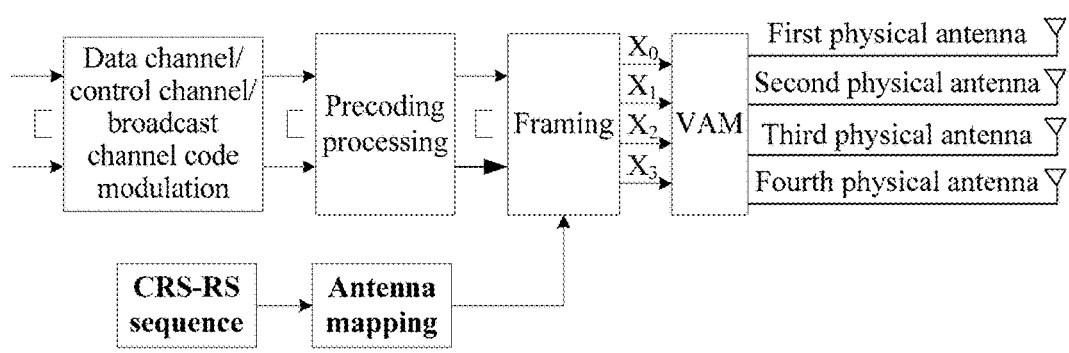
FIG. 4 is a schematic diagram of a downlink data transmission process according to an embodiment of the present disclosure.

For an LTE system, an LTE-A system, or an evolved system based on LTE, the foregoing precoding processing means mapping data from a layer to a logical antenna port. A physical downlink shared channel (PDSCH) in the LTE system is used as an example. After undergoing a series of processing processes such as scrambling, modulation, layer mapping, precoding, and resource mapping, PDSCH data is sent to a terminal by using physical antennas. For the precoding processing process, refer to the 3rd Generation Partnership Project (3GPP) Technical Specification (TS) 36.211. Details are not described herein. FIG. 4 shows a downlink data transmission process according to an embodiment of the present disclosure. Four logical antenna port signals are generated by performing four-antenna precoding processing and framing on data, and the four logical antenna port signals are mapped to four physical antennas through virtual antenna mapping (VAM).

In consideration of framing processing in actual processing, $X_0$, $X_1$, $X_2$, and $X_3$ represent the four logical antenna port signals obtained after framing. The base station maps the four logical antenna port signals $X_0$, $X_1$, $X_2$, and $X_3$ to the four physical antennas through VAM. Specifically, the base station maps the four logical antenna port signals $X_0$, $X_1$, $X_2$, and $X_3$ to the four physical antennas by using a mapping matrix. The mapping matrix, the four logical antenna port signals, and the signals respectively sent by the four physical antennas meet any one of the following relational expressions:

$$\frac{1}{2}\begin{bmatrix} 1 & 0 & 1 & 0 \\ 0 & 1 & 0 & 1 \\ 0 & -j & 0 & j \\ -j & 0 & j & 0 \end{bmatrix} \cdot \begin{bmatrix} X_0 \\ X_1 \\ X_2 \\ X_3 \end{bmatrix} = \frac{1}{2}\begin{bmatrix} X_0+X_2 \\ X_1+X_3 \\ -j(X_1+X_3) \\ -j(X_0+X_2) \end{bmatrix}; \text{or}$$

$$\frac{1}{2}\begin{bmatrix} 1 & 0 & 1 & 0 \\ 0 & 1 & 0 & 1 \\ 0 & 1 & 0 & -1 \\ 1 & 0 & -1 & 0 \end{bmatrix} \cdot \begin{bmatrix} X_0 \\ X_1 \\ X_2 \\ X_3 \end{bmatrix} = \frac{1}{2}\begin{bmatrix} X_0+X_2 \\ X_1+X_3 \\ X_1-X_3 \\ X_0-X_2 \end{bmatrix}; \text{or}$$

$$\frac{1}{2}\begin{bmatrix} 1 & 0 & 1 & 0 \\ 0 & 1 & 0 & 1 \\ -j & 0 & j & 0 \\ 0 & -j & 0 & j \end{bmatrix} \cdot \begin{bmatrix} X_0 \\ X_1 \\ X_2 \\ X_3 \end{bmatrix} = \frac{1}{2}\begin{bmatrix} X_0+X_2 \\ X_1+X_3 \\ -j(X_0+X_2) \\ -j(X_1+X_3) \end{bmatrix}.$$

In the foregoing relational expressions, the mapping matrix and the four logical antenna port signals are on the left of an equal sign, and the signals respectively sent by the four physical antennas are on the right of the equal sign.

The base station sends, to the terminal by using the four physical antennas, the signals obtained by mapping the four logical antenna port signals by using the mapping matrix.

It should be noted that, in this embodiment of the present disclosure, the mapping matrix used for mapping the four logical antenna port signals to the four physical antennas is not limited to the several forms provided in the foregoing relational expressions, and another form may also be used. Preferably, the mapping matrix, the four logical antenna port signals, and the signals respectively sent by the four physical antennas may meet any one of the following relational expressions:

$$\frac{1}{\sqrt{2}}\begin{bmatrix} 1 & 0 & 1 & 0 \\ 0 & 1 & 0 & 1 \\ 0 & -j & 0 & j \\ -j & 0 & j & 0 \end{bmatrix} \cdot \begin{bmatrix} X_0 \\ X_1 \\ X_2 \\ X_3 \end{bmatrix} = \frac{1}{\sqrt{2}}\begin{bmatrix} X_0+X_2 \\ X_1+X_3 \\ -j(X_1+X_3) \\ -j(X_0+X_2) \end{bmatrix}; \text{or}$$

$$\frac{1}{\sqrt{2}}\begin{bmatrix} 1 & 0 & 1 & 0 \\ 0 & 1 & 0 & 1 \\ 0 & 1 & 0 & -1 \\ 1 & 0 & -1 & 0 \end{bmatrix} \cdot \begin{bmatrix} X_0 \\ X_1 \\ X_2 \\ X_3 \end{bmatrix} = \frac{1}{\sqrt{2}}\begin{bmatrix} X_0+X_2 \\ X_1+X_3 \\ X_1-X_3 \\ X_0-X_2 \end{bmatrix}; \text{or}$$

$$\frac{1}{\sqrt{2}}\begin{bmatrix} 1 & 0 & 1 & 0 \\ 0 & 1 & 0 & 1 \\ -j & 0 & j & 0 \\ 0 & -j & 0 & j \end{bmatrix} \cdot \begin{bmatrix} X_0 \\ X_1 \\ X_2 \\ X_3 \end{bmatrix} = \frac{1}{\sqrt{2}}\begin{bmatrix} X_0+X_2 \\ X_1+X_3 \\ -j(X_0+X_2) \\ -j(X_1+X_3) \end{bmatrix}.$$

For example, the mapping matrix, the four logical antenna port signals, and the signals respectively sent by the four physical antennas meet the following relational expression:

$$\frac{1}{\sqrt{2}}\begin{bmatrix} 1 & 0 & 1 & 0 \\ 0 & 1 & 0 & 1 \\ 0 & -j & 0 & j \\ -j & 0 & j & 0 \end{bmatrix} \cdot \begin{bmatrix} X_0 \\ X_1 \\ X_2 \\ X_3 \end{bmatrix} = \frac{1}{\sqrt{2}}\begin{bmatrix} X_0+X_2 \\ X_1+X_3 \\ -j(X_1+X_3) \\ -j(X_0+X_2) \end{bmatrix}.$$

Preferably, a signal sent by a first physical antenna corresponding to the first cell is $X_0+X_2$, a signal sent by a second physical antenna corresponding to the first cell is $X_1+X_3$, a signal sent by a first physical antenna corresponding to the second cell is $-j(X_1+X_3)$, and a signal sent by a second physical antenna corresponding to the second cell is $-j(X_0+X_2)$. Similarly, when the mapping matrix, the four logical antenna port signals, and the signals respectively sent by the four physical antennas meet another relational expression, this manner may still be used to determine a signal sent by each physical antenna.

It should be noted that, in an actual application scenario, a total quantity of physical antennas corresponding to the first cell included in the co-cell network and physical antennas corresponding to the second cell included in the co-cell network may not be limited to a quantity, four, provided in this embodiment of the present disclosure, and the four logical antenna port signals may be mapped to physical antennas according to a quantity of physical antennas corresponding to the first cell and a quantity of physical antennas corresponding to the second cell in the actual application scenario.

In this embodiment of the present disclosure, the base station maps the generated four logical antenna port signals to the four physical antennas in the co-cell network, and sends, to the terminal, the signals obtained through mapping. This can resolve a problem of channel mismatch in an existing co-cell network caused by joint transmission on a control channel and independent transmission on a data channel.

In this embodiment of the present disclosure, after the first cell and the second cell are combined to form the co-cell network by using a co-cell networking technology, a quantity of logical antenna ports included in the co-cell network is greater than or equal to a total quantity of logical antenna ports of the first cell and logical antenna ports of the second cell, where a quantity of logical antenna ports of the first cell is equal to a quantity of logical antenna ports of the second cell, and the quantity of logical antenna ports of the first cell is less than or equal to a quantity of the physical antennas of the first cell. Therefore, compared with a quantity of logical antenna ports in a co-cell network in the prior art, the quantity of logical antenna ports in the co-cell network in this embodiment of the present disclosure is increased, so that a peak quantity of users that can be supported by the co-cell network is increased, and a system throughput can be improved.

Figure 5:
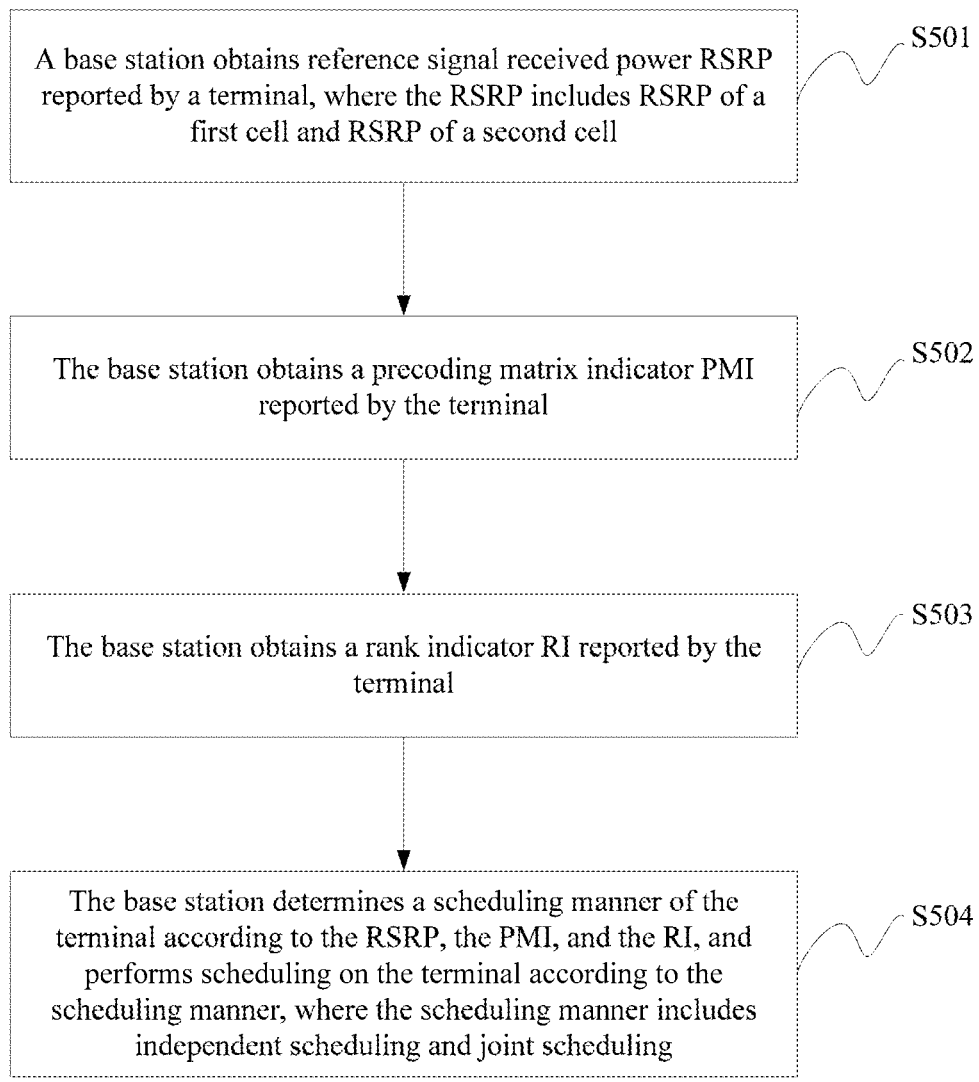
FIG. 5 is a schematic flowchart of a method for scheduling a terminal in a co-cell network according to an embodiment of the present disclosure.

Further, as shown in FIG. 5, an embodiment of the present disclosure provides a method for scheduling a terminal in a co-cell network. The method includes the following steps:

S501. A base station obtains reference signal received power (RSRP) reported by a terminal, where the RSRP includes RSRP of a first cell and RSRP of a second cell.

S502. The base station obtains a precoding matrix indicator (PMI) reported by the terminal.

S503. The base station obtains a rank indicator (RI) reported by the terminal.

S504. The base station determines a scheduling manner of the terminal according to the RSRP, the PMI, and the RI, and performs scheduling on the terminal according to the scheduling manner, where the scheduling manner includes independent scheduling and joint scheduling.

In this embodiment of the present disclosure, the scheduling manner of the terminal may be separately determined by using the method shown in FIG. 5. Alternatively, the method shown in FIG. 5 and the method shown in FIG. 3 may be used jointly. That is, after the scheduling manner of the terminal is determined by using the method shown in FIG. 5, the base station sends data to the terminal by using the multi-antenna transmission method that is in a co-cell network and that is shown in FIG. 3.

In this embodiment of the present disclosure, the RSRP reported by the terminal may be obtained in a plurality of manners. For example, the RSRP reported by the terminal may be obtained by using any one of a sounding reference signal (SRS), a demodulation reference symbol (DMRS), a physical uplink shared channel (PUSCH), or a physical uplink control channel (PUCCH). The RSRP in this embodiment of the present disclosure may be replaced with another signal. For example, the RSRP may be replaced with any one of a signal strength or a signal to interference plus noise ratio (SINR) of the SRS, the DMRS, the PUSCH, the PUCCH, or a random access channel (RACH).

In S504 of this embodiment of the present disclosure, that the base station determines a scheduling manner of the terminal according to the RSRP, the PMI, and the RI that are reported by the terminal includes the following cases:

Case 1: When an absolute value of a difference between the RSRP of the first cell and the RSRP of the second cell is greater than a first threshold and less than a second threshold, the PMI is any one of 0, 1, 2, 3, 8, 9, 10, or 11, and the RI is 1, the base station determines to perform independent scheduling on the terminal.

When the PMI is any one of 0, 2, 9, or 11, the base station determines to perform independent scheduling on the terminal in the first cell.

When the PMI is any one of 1, 3, 8, or 10, the base station determines to perform independent scheduling on the terminal in the second cell.

Case 2: When an absolute value of a difference between the RSRP of the first cell and the RSRP of the second cell is greater than or equal to a second threshold, the PMI is any one of 0, 1, 2, 3, 8, 9, 10, or 11, and the RI is 1, the base station determines to perform independent scheduling on the terminal.

When the PMI is any one of 0, 2, 9, or 11, the base station determines to perform independent scheduling on the terminal in the first cell.

When the PMI is any one of 1, 3, 8, or 10, the base station determines to perform independent scheduling on the terminal in the second cell.

Case 3: When an absolute value of a difference between the RSRP of the first cell and the RSRP of the second cell is greater than or equal to a second threshold, the PMI is 10 or 11, and the RI is 2, the base station determines to perform independent scheduling on the terminal.

When the PMI is 11, the base station determines to perform independent scheduling on the terminal in the first cell.

When the PMI is 10, the base station determines to perform independent scheduling on the terminal in the second cell.

Case 4: When an absolute value of a difference between the RSRP of the first cell and the RSRP of the second cell is less than or equal to a first threshold, and both the PMI and the RI are arbitrary values, the base station determines to perform joint scheduling on the terminal.

Case 5: When an absolute value of a difference between the RSRP of the first cell and the RSRP of the second cell is greater than a first threshold and less than a second threshold, the RI is not 1, and the PMI is an arbitrary value, the base station determines to perform joint scheduling on the terminal.

In the foregoing cases, the first threshold may be set to M+Q or M−Q, the second threshold may be set to P+Q or P−Q. M, Q, and P are all greater than or equal to zero. Preferably, default values of M, Q, and P are respectively 5 dB, 3 dB, and 15 dB.

It should be noted that, in this embodiment of the present disclosure, when the RSRP, the PMI, and the RI that are reported by the terminal and that are obtained by the base station do not meet any one of case 1, case 2, or case 3, the base station may determine to perform joint scheduling on the terminal.

When the base station performs scheduling on the terminal by using the foregoing methods, scheduling accuracy may be improved, and a network capacity is further improved.

Optionally, the base station delivers a PMI measurement restriction indication to the terminal according to an absolute value of a difference between the RSRP of the first cell and the RSRP of the second cell, where the PMI measurement restriction indication is used by the terminal to perform PMI measurement according to the PMI measurement restriction indication; and the base station obtains the PMI reported by the terminal.

The base station may deliver the PMI measurement restriction indication to the terminal according to the absolute value of the difference between the RSRP of the first cell and the RSRP of the second cell by using the following method.

The base station compares the absolute value of the difference between the RSRP of the first cell and the RSRP of the second cell with a preset threshold, and delivers the PMI measurement restriction indication to the terminal according to a comparison result.

When the absolute value of the difference between the RSRP of the first cell and the RSRP of the second cell is less than or equal to a first threshold, the base station determines that the terminal is in an overlapped region of a co-cell network, and the base station delivers a first PMI measurement restriction indication to the terminal. The first PMI measurement restriction indication is used to instruct the terminal to measure a PMI in a PMI set corresponding to the overlapped region of the co-cell network.

When the absolute value of the difference between the RSRP of the first cell and the RSRP of the second cell is greater than a first threshold and less than a second threshold, the base station determines that the terminal is in a middle region of a co-cell network, and the base station delivers a second PMI measurement restriction indication to the terminal. The second PMI measurement restriction indication is used to instruct the terminal to measure a PMI in a PMI set corresponding to the middle region of the co-cell network.

When the absolute value of the difference between the RSRP of the first cell and the RSRP of the second cell is greater than or equal to a second threshold, the base station determines that the terminal is in an independent region of a co-cell network, and the base station delivers a third PMI measurement restriction indication to the terminal. The third PMI measurement restriction indication is used to instruct the terminal to measure a PMI in a PMI set corresponding to the independent region of the co-cell network.

Figure 6:
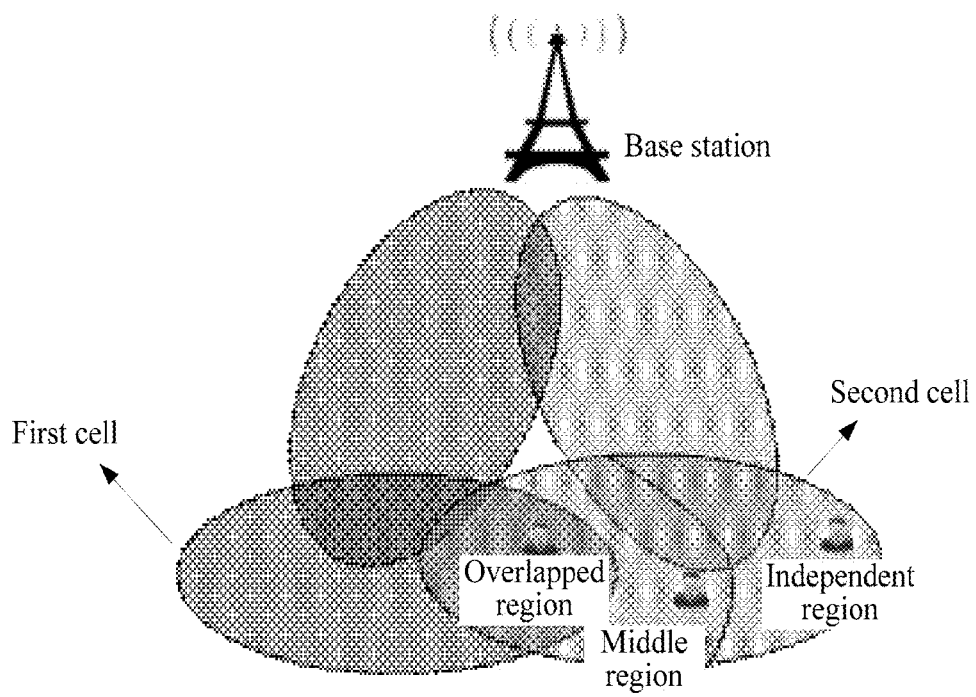
FIG. 6 is a schematic diagram of region distribution of co-cell network division according to an embodiment of the present disclosure.

In the foregoing method used by the base station to deliver the PMI measurement restriction indication to the terminal according to the absolute value of the difference between the RSRP of the first cell and the RSRP of the second cell, the co-cell network is divided into the overlapped region, the middle region, and the independent region according to different degrees of overlapping between the first cell and the second cell in the co-cell network. For example, FIG. 6 is a diagram of region distribution of co-cell network division.

The overlapped region, the middle region, and the independent region in the co-cell network are corresponding to different preset thresholds. The first threshold may be set to M+Q or M−Q, and the second threshold may be set to P+Q or P−Q. M, Q, and P are all greater than or equal to zero. The preset threshold may be set according to region division of the co-cell network. Preferably, default values of M, Q, and P are respectively 5 dB, 3 dB, and 15 dB.

For example, PMI sets respectively corresponding to the overlapped region, the middle region, and the independent region in the co-cell network are shown in Table 1.

TABLE 1

| PMI set corresponding to an overlapped region | PMI set corresponding to a middle region | PMI set corresponding to an independent region |
| --- | --- | --- |
| When RI = 1, the PMI set is 0 to 15 | When RI = 1, the PMI set is [0, 1, 2, 3, 8, 9, 10, 11] | When RI = 1, the PMI set is [0, 1, 2, 3, 8, 9, 10, 11] |
| When RI = 2, the PMI set is 0 to 15 | When RI = 2, the PMI set is [0, 1, 2, 3, 8, 9] | When RI = 2, the PMI set is [10, 11] |
| When RI = 3, the PMI set is 0 to 15 | When RI = 3, the PMI set is 0 to 15 | When RI = 3, the PMI set is 0 to 15 |
| When RI = 4, the PMI set is 0 to 15 | When RI = 4, the PMI set is 0 to 15 | When RI = 4, the PMI set is 0 to 15 |

It should be noted that a region division manner of the co-cell network is not limited to the region division manner provided in this embodiment of the present disclosure; preset thresholds corresponding to different regions in the co-cell network are not limited to the preset thresholds provided in this embodiment of the present disclosure; and PMI sets corresponding to different regions in the co-cell network are not limited to the content provided in this embodiment of the present disclosure, and the PMI sets corresponding to different regions may be set according to an actual co-cell network status.

Optionally, after the base station obtains the RSRP of the first cell and the RSRP of the second cell, if the base station determines that a current load of the co-cell network exceeds a preset threshold, the base station delivers the PMI measurement restriction indication to the terminal according to the absolute value of the difference between the RSRP of the first cell and the RSRP of the second cell by using the foregoing method; otherwise, the base station does not deliver the PMI measurement restriction indication to the terminal, that is, a PMI range in which the terminal performs PMI measurement is a universal set. A value of the preset threshold corresponding to the load of the co-cell network ranges from 0% to 100%. Preferably, the preset threshold is 20%.

If a co-cell network region in which the terminal is located and that is previously determined by the base station is the same as a co-cell network region in which the terminal is located and that is currently determined by the base station, the base station does not need to repeatedly deliver a same PMI measurement restriction indication to the terminal. Optionally, the base station delivers the PMI measurement restriction indication to the terminal by using radio resource control (RRC) signaling. In this case, a PMI set corresponding to the co-cell network region in which the terminal is located is set by setting a corresponding item in the RRC signaling (refer to TS 36.331 and TS 36.213). This pertains to the prior art, and details are not described herein.

In the prior art, the base station does not restrict, by delivering a PMI measurement restriction indication to the terminal, a PMI range in which the terminal performs PMI measurement. The base station delivers RRC signaling to the terminal when the terminal initially accesses a network. The RRC signaling indicates that the PMI range in which the terminal performs PMI measurement is a universal set. The universal set indicates that a PMI set of each RI is 0 to 15. In this embodiment of the present disclosure, the base station restricts, by delivering the PMI measurement restriction indication to the terminal, the PMI range in which the terminal performs PMI measurement. After the terminal receives the PMI measurement restriction indication delivered by the base station, upon PMI reporting, the terminal selects, from a PMI range allowed by the PMI measurement restriction indication, an optimal PMI as a PMI reported to the base station. A process for selecting the PMI by the terminal pertains to the prior art, and details are not described herein. In this embodiment of the present disclosure, the base station delivers the PMI measurement restriction indication to the terminal, so as to reduce measurement complexity for the terminal, and further reduce power consumption of the terminal.

Optionally, an embodiment of the present disclosure further provides a method for scheduling a terminal in a co-cell network. The method includes:

obtaining, by a base station, RSRP reported by a terminal, where the RSRP includes RSRP of a first cell and RSRP of a second cell; and determining, by the base station, a scheduling manner of the terminal according to the RSRP, and performing scheduling on the terminal according to the scheduling manner, where the scheduling manner includes independent scheduling and joint scheduling.

In this embodiment of the present disclosure, the scheduling manner of the terminal may be separately determined by using the foregoing method for scheduling a terminal in a co-cell network. Alternatively, the foregoing method for scheduling a terminal in a co-cell network and the method shown in FIG. 3 may be used jointly. That is, after the scheduling manner of the terminal is determined by using the foregoing method for scheduling a terminal in a co-cell network, the base station sends data to the terminal by using the multi-antenna transmission method that is in a co-cell network and that is shown in FIG. 3.

Further, when an absolute value of a difference between the RSRP of the first cell and the RSRP of the second cell is less than a second threshold, the base station determines to perform joint scheduling on the terminal.

When an absolute value of a difference between the RSRP of the first cell and the RSRP of the second cell is greater than or equal to a second threshold, and the difference between the RSRP of the first cell and the RSRP of the second cell is greater than or equal to 0, the base station determines to perform independent scheduling on the terminal in the first cell.

When an absolute value of a difference between the RSRP of the first cell and the RSRP of the second cell is greater than or equal to a second threshold, and the difference between the RSRP of the first cell and the RSRP of the second cell is less than 0, the base station determines to perform independent scheduling on the terminal in the second cell.

The second threshold may be set to P+Q or P−Q. Both P and Q are greater than or equal to zero. Preferably, default values of P and Q are respectively 15 dB and 3 dB.

In the embodiments of the present disclosure, the base station maps the generated four logical antenna port signals to the four physical antennas in the co-cell network, and sends, to the terminal, the signals obtained through mapping. This can resolve the problem of channel mismatch in the existing co-cell network caused by joint transmission on the control channel and independent transmission on the data channel, and improves the system throughput. Compared with the quantity of logical antenna ports in the co-cell network in the prior art, the quantity of logical antenna ports in the co-cell network in the embodiments of the present disclosure is increased, so that the peak quantity of users that can be supported by the co-cell network is increased, and the system throughput can be improved. The embodiments of the present disclosure further provide the method for scheduling a terminal in a co-cell network, so that the network capacity can be further improved.

Figure 7:
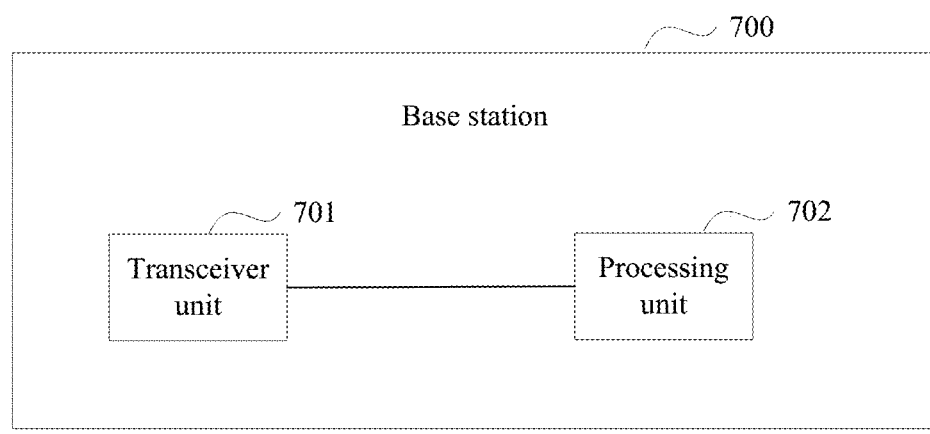
FIG. 7 is a schematic structural diagram of a base station according to an embodiment of the present disclosure.

Based on the foregoing embodiments, an embodiment of the present disclosure further provides a base station. A co-cell network in which the base station is located includes a first cell and a second cell, the first cell is corresponding to two physical antennas, and the second cell is corresponding to two physical antennas. The base station may use the method provided in the embodiment corresponding to FIG. 3 to implement the multi-antenna transmission method in a co-cell network. As shown in FIG. 7, a base station 700 includes a transceiver unit 701 and a processing unit 702.

The transceiver unit 701 is configured to receive or send a signal.

The processing unit 702 is configured to: perform four-antenna precoding processing for a terminal scheduled by the base station, and generate four logical antenna port signals; and map the four logical antenna port signals to four physical antennas, and control the transceiver unit 701 to send, to the terminal, signals obtained through mapping. The four physical antennas are the two physical antennas corresponding to the first cell and the two physical antennas corresponding to the second cell.

Optionally, when the processing unit 702 maps the four logical antenna port signals to the four physical antennas, the processing unit 702 is specifically configured to:

map the four logical antenna port signals to the four physical antennas by using a mapping matrix, where the mapping matrix, the four logical antenna port signals, and the signals respectively sent by the four physical antennas meet any one of the following relational expressions:

$$\frac{1}{\sqrt{2}}\begin{bmatrix} 1 & 0 & 1 & 0 \\ 0 & 1 & 0 & 1 \\ 0 & -j & 0 & j \\ -j & 0 & j & 0 \end{bmatrix} \cdot \begin{bmatrix} X_0 \\ X_1 \\ X_2 \\ X_3 \end{bmatrix} = \frac{1}{\sqrt{2}}\begin{bmatrix} X_0 + X_2 \\ X_1 + X_3 \\ -j(X_1 + X_3) \\ -j(X_0 + X_2) \end{bmatrix}; \text{ or}$$

$$\frac{1}{\sqrt{2}}\begin{bmatrix} 1 & 0 & 1 & 0 \\ 0 & 1 & 0 & 1 \\ 0 & 1 & 0 & -1 \\ 1 & 0 & -1 & 0 \end{bmatrix} \cdot \begin{bmatrix} X_0 \\ X_1 \\ X_2 \\ X_3 \end{bmatrix} = \frac{1}{\sqrt{2}}\begin{bmatrix} X_0 + X_2 \\ X_1 + X_3 \\ X_1 - X_3 \\ X_0 - X_2 \end{bmatrix}; \text{ or}$$

$$\frac{1}{\sqrt{2}}\begin{bmatrix} 1 & 0 & 1 & 0 \\ 0 & 1 & 0 & 1 \\ -j & 0 & j & 0 \\ 0 & -j & 0 & j \end{bmatrix} \cdot \begin{bmatrix} X_0 \\ X_1 \\ X_2 \\ X_3 \end{bmatrix} = \frac{1}{\sqrt{2}}\begin{bmatrix} X_0 + X_2 \\ X_1 + X_3 \\ -j(X_0 + X_2) \\ -j(X_1 + X_3) \end{bmatrix},$$

where $X_0, X_1, X_2$, and $X_3$ represent the four logical antenna port signals.

Figure 8:
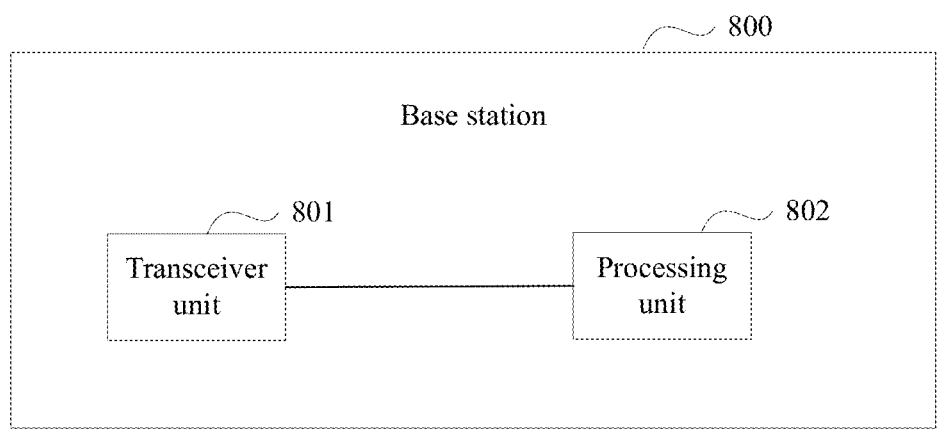
FIG. 8 is a schematic structural diagram of a base station according to an embodiment of the present disclosure.

Based on the foregoing embodiments, an embodiment of the present disclosure further provides a base station. A co-cell network in which the base station is located includes a first cell and a second cell, the first cell is corresponding to two physical antennas, and the second cell is corresponding to two physical antennas. The base station may use the method provided in the embodiment corresponding to FIG. 5 to implement the method for scheduling a terminal in a co-cell network. As shown in FIG. 8, a base station 800 includes a transceiver unit 801 and a processing unit 802.

The transceiver unit 801 is configured to: obtain reference signal received power RSRP reported by a terminal, where the RSRP includes RSRP of the first cell and RSRP of the second cell; obtain a precoding matrix indicator PMI reported by the terminal; and obtain a rank indicator RI reported by the terminal.

The processing unit 802 is configured to: determine a scheduling manner of the terminal according to the RSRP, the PMI, and the RI that are obtained by the transceiver unit 801, and perform scheduling on the terminal according to the scheduling manner. The scheduling manner includes independent scheduling and joint scheduling.

Optionally, the processing unit 802 is specifically configured to:

when an absolute value of a difference between the RSRP of the first cell and the RSRP of the second cell is greater than a first threshold and less than a second threshold, the PMI is any one of 0, 1, 2, 3, 8, 9, 10, or 11, and the RI is 1, determine to perform independent scheduling on the terminal.

Optionally, the processing unit 802 is specifically configured to:

when an absolute value of a difference between the RSRP of the first cell and the RSRP of the second cell is greater than or equal to a second threshold, the PMI is any one of 0, 1, 2, 3, 8, 9, 10, or 11, and the RI is 1, determine to perform independent scheduling on the terminal.

Optionally, the processing unit 802 is specifically configured to:

when an absolute value of a difference between the RSRP of the first cell and the RSRP of the second cell is greater than or equal to a second threshold, the PMI is 10 or 11, and the RI is 2, determine to perform independent scheduling on the terminal.

Optionally, the processing unit 802 is specifically configured to:

when an absolute value of a difference between the RSRP of the first cell and the RSRP of the second cell is less than or equal to a first threshold, determine to perform joint scheduling on the terminal; or when an absolute value of a difference between the RSRP of the first cell and the RSRP of the second cell is greater than a first threshold and less than a second threshold, and the RI is not 1, determine to perform joint scheduling on the terminal.

Optionally, the processing unit 802 is further configured to:

determine, according to an absolute value of a difference between the RSRP of the first cell and the RSRP of the second cell, a PMI measurement restriction indication to be delivered to the terminal, where the PMI measurement restriction indication is used by the terminal to perform PMI measurement according to the PMI measurement restriction indication.

When the transceiver unit 801 obtains the precoding matrix indicator PMI reported by the terminal, the transceiver unit 801 is specifically configured to:

deliver the PMI measurement restriction indication determined by the processing unit 802 to the terminal; and obtain the PMI that is reported by the terminal according to the PMI measurement restriction indication.

In this embodiment of the present disclosure, the scheduling manner of the terminal in the co-cell network may be separately determined by using the base station shown in FIG. 8. Alternatively, the base station shown in FIG. 7 and the base station shown in FIG. 8 may be used jointly. That is, after the base station shown in FIG. 8 determines the scheduling manner of the terminal, the base station shown in FIG. 7 sends data to the terminal.

Figure 9:
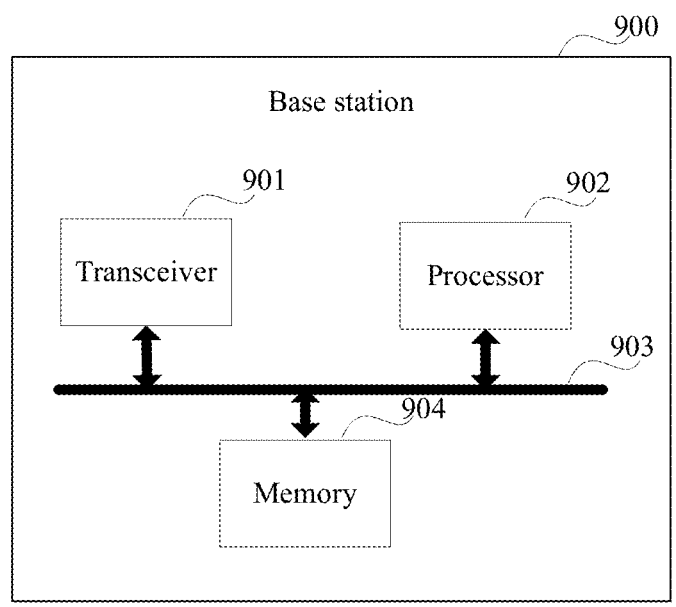
FIG. 9 is a schematic structural diagram of a base station according to an embodiment of the present disclosure.

Based on the foregoing embodiments, an embodiment of the present disclosure further provides a base station. The base station may use the method provided in the embodiment corresponding to FIG. 3 and/or FIG. 5, and may be a device that is the same as the base station shown in FIG. 7 and/or FIG. 8. As shown in FIG. 9, a base station 900 includes a transceiver 901, a processor 902, a bus 903, and a memory 904.

The transceiver 901, the processor 902, and the memory 904 are connected to each other by using the bus 903. The bus 903 may be a peripheral component interconnect (PCI) bus, an extended industry standard architecture (EISA) bus, or the like. The bus may be classified into an address bus, a data bus, a control bus, and the like. For ease of representation, the bus is represented by using only one thick line in FIG. 9. However, it does not mean that there is only one bus or one type of bus.

In the base station 900, the transceiver 901 correspondingly performs an operation performed by the transceiver unit in FIG. 7 and/or FIG. 8, the processor 902 correspondingly performs an operation performed by the processing unit in FIG. 7 and/or FIG. 8, and the memory 904 is configured to store a program. Specifically, the program may include program code, and the program code includes a computer operation instruction. The memory 904 may include a random access memory (RAM), and may further include a non-volatile memory, such as at least one magnetic disk storage. The processor 902 executes the application program stored in the memory 904, to implement the multi-antenna transmission method in a co-cell network and the method for scheduling a terminal in a co-cell network.

Although some embodiments of the present disclosure have been described, a person skilled in the art can make changes and modifications to these embodiments once they learn the basic inventive concept. Therefore, the following claims are intended to be construed as to cover the embodiments and all changes and modifications falling within the scope of the present disclosure.

Obviously, a person skilled in the art can make various modifications and variations to the embodiments of the present disclosure without departing from the scope of the embodiments of the present disclosure. The present disclosure is intended to cover these modifications and variations provided that these modifications and variations of the embodiments of the present disclosure fall within the scope of protection defined by the following claims of the present disclosure and their equivalent technologies.

What is claimed is:

1. A multi-antenna transmission method in a co-cell network, wherein the co-cell network comprises a first cell and a second cell, the first cell corresponds to two physical antennas, the second cell corresponds to two physical antennas different from the two physical antennas corresponding to the first cell, and the method comprises:

performing, by a base station, four-antenna precoding processing for a scheduled terminal, the four-antenna precoding processing generating four logical antenna port signals;

mapping, by the base station, the four logical antenna port signals to the four physical antennas, including:

mapping, by the base station, the four logical antenna port signals to the four physical antennas using a mapping matrix, wherein the mapping matrix, the four logical antenna port signals, and the signals respectively sent by the four physical antennas satisfy one of the following relational expressions:

$$\frac{1}{\sqrt{2}} \begin{bmatrix} 1 & 0 & 1 & 0 \\ 0 & 1 & 0 & 1 \\ 0 & -j & 0 & j \\ -j & 0 & j & 0 \end{bmatrix} \cdot \begin{bmatrix} X_0 \\ X_1 \\ X_2 \\ X_3 \end{bmatrix} = \frac{1}{\sqrt{2}} \begin{bmatrix} X_0 + X_2 \\ X_1 + X_3 \\ -j(X_1 + X_3) \\ -j(X_0 + X_2) \end{bmatrix};$$

$$\frac{1}{\sqrt{2}} \begin{bmatrix} 1 & 0 & 1 & 0 \\ 0 & 1 & 0 & 1 \\ 0 & 1 & 0 & -1 \\ 1 & 0 & -1 & 0 \end{bmatrix} \cdot \begin{bmatrix} X_0 \\ X_1 \\ X_2 \\ X_3 \end{bmatrix} = \frac{1}{\sqrt{2}} \begin{bmatrix} X_0 + X_2 \\ X_1 + X_3 \\ X_1 - X_3 \\ X_0 - X_2 \end{bmatrix}; \text{ and}$$

$$\frac{1}{\sqrt{2}} \begin{bmatrix} 1 & 0 & 1 & 0 \\ 0 & 1 & 0 & 1 \\ -j & 0 & j & 0 \\ 0 & -j & 0 & j \end{bmatrix} \cdot \begin{bmatrix} X_0 \\ X_1 \\ X_2 \\ X_3 \end{bmatrix} = \frac{1}{\sqrt{2}} \begin{bmatrix} X_0 + X_2 \\ X_1 + X_3 \\ -j(X_0 + X_2) \\ -j(X_1 + X_3) \end{bmatrix},$$

wherein $X_0$, $X_1$, $X_2$, and $X_3$ represent the four logical antenna port signals; and sending, to the terminal, the four logical antenna port signals through the mapped four physical antennas.

2. The method according to claim 1, further comprising:

obtaining, by the base station, reference signal received power (RSRP) from the terminal, wherein the RSRP comprises first cell RSRP and second cell RSRP;

obtaining, by the base station, a precoding matrix indicator (PMI) from the terminal;

obtaining, by the base station, a rank indicator (RI) from the terminal; and determining, by the base station, a scheduling of the terminal according to the first cell RSRP, the second cell RSRP, the PMI, and the RI; and performing the scheduling on the terminal, wherein the scheduling comprises an independent scheduling and a joint scheduling.

3. The method according to claim 2, wherein the determining, by the base station, a scheduling of the terminal according to the first cell RSRP, the second cell RSRP, the PMI, and the RI comprises:
when an absolute value of a difference between the first cell RSRP and the second cell RSRP is greater than a first threshold and less than a second threshold, the PMI is one of 0, 1, 2, 3, 8, 9, 10, and 11, and the RI is 1, determining, by the base station, to perform the independent scheduling on the terminal.

4. The method according to claim 2, wherein the determining, by the base station, a scheduling of the terminal according to the first cell RSRP, the second cell RSRP, the PMI, and the RI comprises:
when an absolute value of a difference between the first cell RSRP and the second cell RSRP is greater than or equal to a second threshold, the PMI is one of 0, 1, 2, 3, 8, 9, 10, and 11, and the RI is 1, determining, by the base station, to perform the independent scheduling on the terminal.

5. The method according to claim 2, wherein the determining, by the base station, a scheduling of the terminal according to the first cell RSRP, the second cell RSRP, the PMI, and the RI comprises:
when an absolute value of a difference between the first cell RSRP and the second cell RSRP is greater than or equal to a second threshold, the PMI is 10 or 11, and the RI is 2, determining, by the base station, to perform the independent scheduling on the terminal.

6. The method according to claim 2, wherein the determining, by the base station, a scheduling of the terminal according to the first cell RSRP, the second cell RSRP, the PMI, and the RI comprises one of:
when an absolute value of a difference between the first cell RSRP and the second cell RSRP is less than or equal to a first threshold, determining, by the base station, to perform the joint scheduling on the terminal; and
when the absolute value of the difference between the first cell RSRP and the second cell RSRP is greater than the first threshold and less than a second threshold, and the RI is not 1, determining, by the base station, to perform the joint scheduling on the terminal.

7. The method according to claim 2, wherein the obtaining, by the base station, a precoding matrix indicator (PMI) from the terminal comprises:
delivering, by the base station, a PMI measurement restriction indication to the terminal according to an absolute value of a difference between the first cell RSRP and the second cell RSRP, wherein the PMI measurement restriction indication is used by the terminal to perform a PMI measurement according to the PMI measurement restriction indication; and
obtaining, by the base station, the PMI from the terminal.

8. A base station, wherein a co-cell network in which the base station is located comprises a first cell and a second cell, the first cell corresponds to two physical antennas, the second cell corresponds to two physical antennas different from the two physical antennas corresponding to the first cell, and the base station comprises:
a transceiver, the transceiver configured to receive or send a signal; and
at least one processor, the at least one processor configured to:

perform four-antenna precoding processing for a terminal scheduled by the base station, the four-antenna precoding processing generate four logical antenna port signals;
map the four logical antenna port signals to the four physical antennas using a mapping matrix, wherein the mapping matrix, the four logical antenna port signals, and the signals respectively sent by the four physical antennas satisfy one of the following relational expressions:

$$\frac{1}{\sqrt{2}}\begin{bmatrix}1 & 0 & 1 & 0\\0 & 1 & 0 & 1\\0 & -j & 0 & j\\-j & 0 & j & 0\end{bmatrix}\cdot\begin{bmatrix}X_0\\X_1\\X_2\\X_3\end{bmatrix}=\frac{1}{\sqrt{2}}\begin{bmatrix}X_0+X_2\\X_1+X_3\\-j(X_1+X_3)\\-j(X_0+X_2)\end{bmatrix};$$

$$\frac{1}{\sqrt{2}}\begin{bmatrix}1 & 0 & 1 & 0\\0 & 1 & 0 & 1\\0 & 1 & 0 & -1\\1 & 0 & -1 & 0\end{bmatrix}\cdot\begin{bmatrix}X_0\\X_1\\X_2\\X_3\end{bmatrix}=\frac{1}{\sqrt{2}}\begin{bmatrix}X_0+X_2\\X_1+X_3\\X_1-X_3\\X_0-X_2\end{bmatrix};\text{ and}$$

$$\frac{1}{\sqrt{2}}\begin{bmatrix}1 & 0 & 1 & 0\\0 & 1 & 0 & 1\\-j & 0 & j & 0\\0 & -j & 0 & j\end{bmatrix}\cdot\begin{bmatrix}X_0\\X_1\\X_2\\X_3\end{bmatrix}=\frac{1}{\sqrt{2}}\begin{bmatrix}X_0+X_2\\X_1+X_3\\-j(X_0+X_2)\\-j(X_1+X_3)\end{bmatrix},$$

wherein $X_0$, $X_1$, $X_2$, and $X_3$ represent the four logical antenna port signals; and
control the transceiver to send, to the terminal, the four logical antenna port signals through the mapped four physical antennas.

9. The base station according to claim 8, wherein the at least one processor is further configured to:
obtain reference signal received power (RSRP) from the terminal, wherein the RSRP comprises first cell RSRP and second cell RSRP;
obtain a precoding matrix indicator (PMI) from the terminal;
obtain a rank indicator (RI) from the terminal; and
determine a scheduling of the terminal according to the first cell RSRP, the second cell RSRP, the PMI, and the RI; and
performing the scheduling on the terminal, wherein the scheduling comprises an independent scheduling and a joint scheduling.

10. The base station according to claim 9, wherein the at least one processor further configured to:
when an absolute value of a difference between the first cell RSRP and the second cell RSRP is greater than a first threshold and less than a second threshold, the PMI is one of 0, 1, 2, 3, 8, 9, 10, and 11, and the RI is 1, determine to perform the independent scheduling on the terminal.

11. The base station according to claim 9, wherein the at least one processor is further configured to:
when an absolute value of a difference between the first cell RSRP and the second cell RSRP is greater than or equal to a second threshold, the PMI is one of 0, 1, 2, 3, 8, 9, 10, and 11, and the RI is 1, determine to perform the independent scheduling on the terminal.

12. The base station according to claim 9, wherein the at least one processor is further configured to:
when an absolute value of a difference between the first cell RSRP and the second cell RSRP is greater than or equal to a second threshold, the PMI is 10 or 11, and the RI is 2, determine to perform the independent scheduling on the terminal.

13. The base station according to claim 9, wherein the at least one processor is further configured to one of:
when an absolute value of a difference between the first cell RSRP and t the second cell RSRP is less than or equal to a first threshold, determine to perform the joint scheduling on the terminal; and
when the absolute value of the difference between the first cell RSRP and the second cell RSRP is greater than the first threshold and less than a second threshold, and the RI is not 1, determining, by the base station, to perform the joint scheduling on the terminal.

14. The base station according to claim 9, wherein the transceiver is further configured to:
send a PMI measurement restriction indication to the terminal according to an absolute value of a difference between the first cell RSRP and the second cell RSRP, wherein the PMI measurement restriction indication is used by the terminal to perform a PMI measurement according to the PMI measurement restriction indication; and
receive the PMI from the terminal.

* * * * *